S. F. PERKINS.
PLOW ATTACHMENT.
APPLICATION FILED NOV. 29, 1916.
1,252,491.
Patented Jan. 8, 1918.
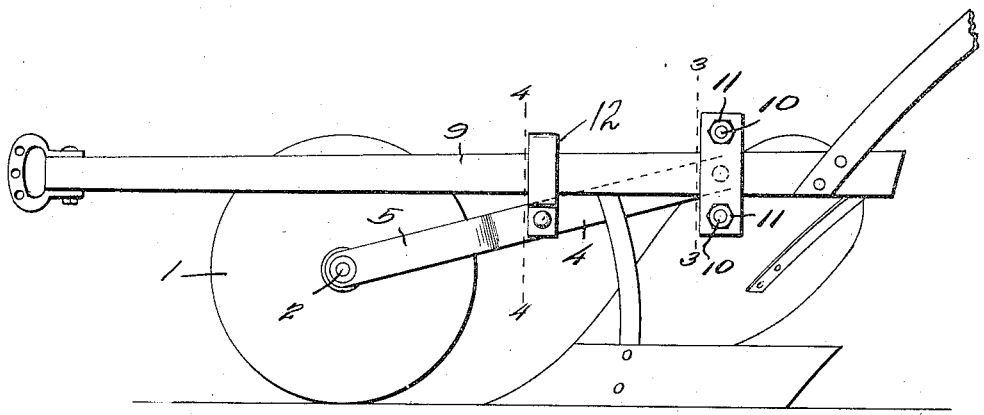
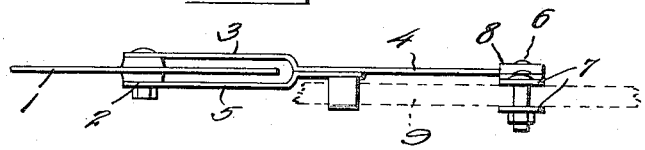
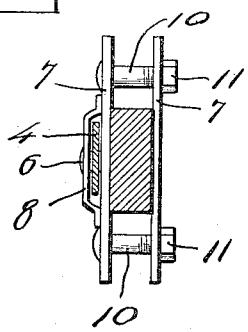 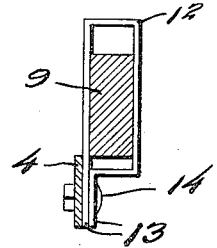
INVENTOR
Sim F. Perkins
WITNESSES
BY Richard B. Owen
ATTORNEY

UNITED STATES PATENT OFFICE.

SIM F. PERKINS, OF HENDERSON, TEXAS.

PLOW ATTACHMENT.

1,252,491. Specification of Letters Patent. Patented Jan. 8, 1918.

Application filed November 29, 1916. Serial No. 134,183.

*To all whom it may concern:*

Be it known that I, SIM F. PERKINS, a citizen of the United States, residing at Henderson, in the county of Rusk and State of Texas, have invented certain new and useful Improvements in Plow Attachments, of which the following is a specification.

This invention relates to certain new and useful improvements in plow attachments and has for its primary object, the provision of a roller adapted to be mounted upon the beam and act as a fender.

Another object of the invention resides in the provision of a plow attachment of this character which will be especially adapted for use upon the plow when working around small plants such as corn, cotton, peas and peanuts and the like.

Another object resides in the provision of a device of this character which is of simple construction, inexpensive and highly efficient in use.

A further object resides in the provision of an attachment of the above stated character which may be readily mounted upon the conventional form of plow and in which the roller and fork for the same will be free to move a limited distance in a vertical direction and thereby prevent the plants from hanging or catching upon the same.

With the above and other objects in view, as will appear as the nature of the invention is better understood, the same consists in the novel combination and arrangement of parts as will be hereinafter more specifically set forth, shown in the drawings and pointed out in the appended claims.

In the accompanying drawings forming a part of this application and in which like designating reference characters refer to corresponding parts throughout the several views, Figure 1 is an elevation of the complete device applied to a conventional form of plow.

Fig. 2 is a top plan view thereof, showing only a portion of the plow beam by dotted lines.

Fig. 3 is a detail transverse section on the plane of line 3—3 of Fig. 1, and

Fig. 4 is a similar view, on the plane of line 4—4 of Fig. 1.

Referring more in detail to the drawings, 1 designates the roller or disk which is carried upon the axle 2 mounted in the bifurcated lower end 3 of the pivoted member 4. While this member 4 may be formed in a single piece, the lower end thereof is shown in Fig. 2 as being composed of two pieces, the extra piece 5 being secured to the main or body portion of the member 4 by welding or in any other suitable manner. The upper end of the member 4 is mounted upon the pivot pin 6 which extends through one of the upper clamps 7 and also through a supporting plate 8 secured to said member 7.

The clamping members 7 are positioned upon opposite sides of the plow beam 9 and clamped in adjusted position upon the same by the bolts 10 and nuts 11 or other suitable and well known means. The members 7 are preferably positioned upon the beam 9 at a point above the plow blade or shovel and the member 4 is extended forwardly and downwardly, thereby supporting the roller or disk 1 to the side of the beam 9 and in front of the plow blade or shovel, as clearly shown in Fig. 1.

In order to limit pivotal movement of the member 4 and thereby control the raising and lowering of the roller or disk 1, I have provided a loop or link 12, preferably formed of a single strip of metal and bent to provide parallel sides and ends with the ends of the metal extended in parallel relation from one corner of the loop or link, as shown at 13, in order that the device may be pivoted to the member 4 by the pivot bolt 14 extended through said member 4 at the lower end of the body portion of the same, as clearly shown in the drawings. The loop or link 12 is engaged over the beam 9 and the length of the same is such as to allow vertical movement thereof upon said beam 9. It will be understood that the loop or link 12 is placed with the pivot member 14 thereof at a lower corner of the same, so that the member 4 may be supported below the beam 9.

From the foregoing, it will be apparent that this device will be highly efficient in use as the fender or disk 1 is allowed to work up and down upon the plow beam, thereby preventing trash or the plant from catching and hanging upon the same.

It will be readily seen that, by loosening the nut on the bolt 14 and the nut 11, the attachment may be reversed to serve on the left side of the plow beam 9. It will also be understood that this attachment may be employed in connection with a straight stock or shovel plow, with the member 4 of the attachment inclined rearwardly.

While the form of the invention shown and described is believed to be the preferred embodiment thereof, it is nevertheless to be understood that minor changes in the details of construction and arrangement of parts may be made therein within the scope of the appended claims without departing from the spirit of the invention.

I claim:

1. The combination with a plow and a plow beam, of a bar having one end pivotally engaged with said beam, a rotatable disk carried by the opposite end of said bar, an elongated loop member surrounding said beam, and provided with an extension pivotally secured to said bar, said loop member being movable vertically on the beam to permit a corresponding movement of the bar and disk.

2. The combination with a plow and plow beam, of clamping plates mounted thereon, a supporting plate mounted on one of the clamping plates, a bar having one end pivotally connected with the supporting plate, a loop secured to the bar and having vertical sliding engagement with the plow beam, the end bars of said loop serving to limit the vertical movement of the bar and a disk rotatable on said bar.

3. In a device of the character described a horizontal beam, clamping plates mounted thereon, a supporting plate mounted on one of the clamping plates, a disk supporting bar pivotally mounted on the supporting plate, a rolling disk carried by the disk supporting bar, a substantially rectangular loop engaged about the beam and having operative connection with the disk supporting bar, the loop being capable of vertical movement on the beam.

In testimony whereof I affix my signature in presence of two witnesses.

SIM F. PERKINS.

Witnesses:
J. T. WATSON,
R. E. YOUNG.

Copies of this patent may be obtained for five cents each, by addressing the "Commissioner of Patents, Washington, D. C."